United States Patent [19]

Chalmers et al.

[11] E Re. 30,831

[45] Reissued Dec. 22, 1981

[54] ELECTRIC DISCHARGE DEVICES

[75] Inventors: Alan G. Chalmers; David O. Wharmby, London, England

[73] Assignee: Thorn EMI Limited, Hayes, England

[21] Appl. No.: 965,278

[22] Filed: Dec. 1, 1978

Related U.S. Patent Documents

Reissue of:

[64] Patent No.: 3,867,664
Issued: Feb. 18, 1975
Appl. No.: 434,927
Filed: Jan. 21, 1974

[30] Foreign Application Priority Data

Jan. 23, 1973 [GB] United Kingdom ..... 3469/73

[51] Int. Cl.[3] ..... H01J 61/18
[52] U.S. Cl. ..... 313/229; 313/225
[58] Field of Search ..... 313/229, 225

[56] References Cited

U.S. PATENT DOCUMENTS 3,771,009 12/1973 Silver et al. ..... 313/229

FOREIGN PATENT DOCUMENTS 2102866 4/1972 France .
1327343 8/1973 United Kingdom .

*Primary Examiner*—Palmer C. Demeo
*Assistant Examiner*—Darwin R. Hostetter
*Attorney, Agent, or Firm*—Robert F. O'Connell; George W. Neuner

[57] ABSTRACT

The inclusion of an alkali metal halide in the gas fill of a high pressure mercury and aluminium halide discharge lamp improves the color appearance of the lamp; notably by lowering the color temperature, while maintaining or even increasing the efficacy and stability of the discharge. Preferred contents are 10 to 30 mg $cm^{-3}$ mercury, 5 to 100 $\mu$mol $cm^{-3}$ aluminium halide and 0.5 to 150 $\mu$mol $cm^3$ alkali metal halide, with the molar ratio of alkali metal halide to aluminium halide in the range 0.1 to 1.5 and the total number of aluminium and alkali metal atoms preferably greater than the total number of halogen atoms.

9 Claims, 3 Drawing Figures

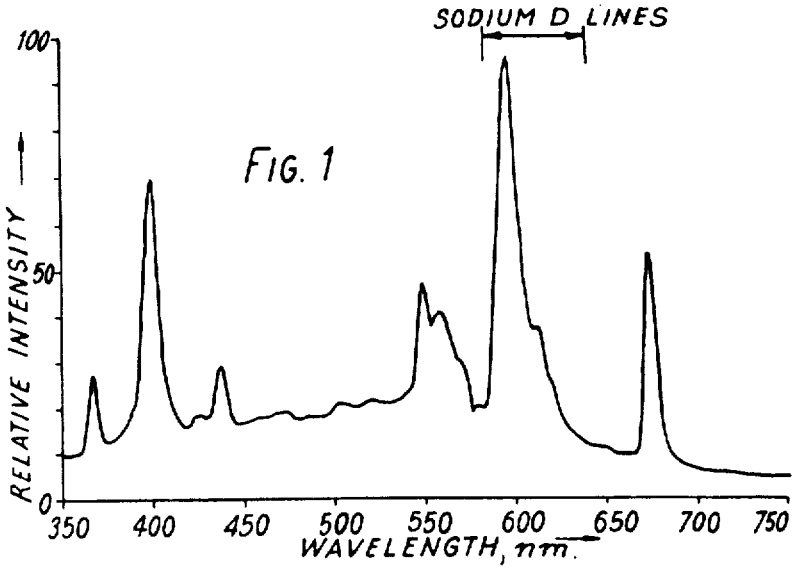
FIG. 1
FIG. 2.
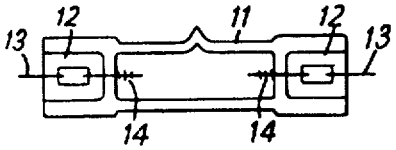
FIG. 3.
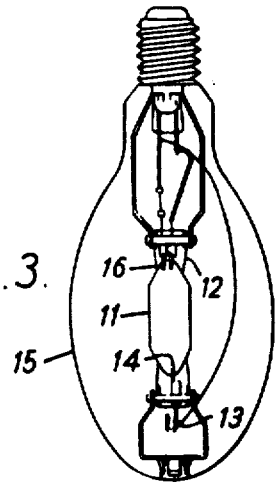

ELECTRIC DISCHARGE DEVICES

Matter enclosed in heavy brackets [ ] appears in the original patent but forms no part of this reissue specification; matter printed in italics indicates the additions made by reissue.

The present invention relates to high-pressure metal halide electrical discharge devices. In metal halide lamps the discharge takes place in a gas atmosphere comprising a rare gas, mercury vapour and the halide of one or more elements. The rare gas is present to make the discharge easier to start. At the operating temperature of the lamp, the mercury pressure is usually in the range of 0 to 30 atmospheres.

Metal halide discharges comprising aluminium chloride, mercury and a rare gas (as described for example in British Pat. No. 1 190 833 and 1 253 984) are known to have high efficacies and spectral power distributions that are continuous or quasi-continuous. They therefore have desirable colour rendering properties. Other aluminium halides afford similar spectra although with lower efficacies. The aluminium halide discharges suffer from having undesirable colour appearance, being either on the green side of white or having too high a colour temperature. Their arcs also tend to be constricted and this causes instability.

According to the present invention, halides of one or more alkali metals (Li, Na, K, Rb, [Ca] *Cs*) are added to aluminium halide discharges in the presence of mercury and a rare gas. The alkali halides introduced into the discharge filling modify the colour appearance, notably by lowering the colour temperature, whilst maintaining and in some cases increasing the efficacy, increasing the stability and maintaining adequate colour rendering properties.

Typical practical embodiments of the present invention are metal halide discharge lamps having a discharge vessel, usually made of fused silica, the wall of which is power loaded at 10–100 $Wcm^{-2}$, which contains a low partial pressure of rare gas, from 0 to 30 $mg.cm^{-3}$ of mercury, an aluminium halide and an alkali metal halide such that the ratio of the number of molecules of alkali metal halide to aluminium halide (assumed for this purpose to be in the form of trihalide) is in the range 0.1 to 1.5. Such embodiments normally contain sufficient aluminium and alkali metal halide in the discharge vessel for unevaporated aluminium halide and alkali metal halide to be present in the vessel during the operation of the lamp so that the vapours of the halides in the discharge are saturated. It is sometimes advantageous to add additional aluminium metal to prolong electrode life (as described in British Pat. No. 1 253 948).

The invention will be further described, by way of example with reference to the accompanying drawings, in which:

FIG. 1 is an emission spectrum of one example of a lamp according to the invention containing sodium chloride and aluminium chloride;

FIG. 2 shows one type of discharge tube embodying the invention; and

FIG. 3 shows a second type of discharge tube embodying the invention mounted in a suitable lamp form.

In a preferred form of the present invention, sodium chloride and aluminium chloride are used in the discharge lamp, which also contains mercury and rare gas.

The total number of atoms of aluminium and sodium is preferably larger than the total number of chlorine atoms, since where the total number of metal atoms (aluminium and alkali metal) is greater than the number of chlorine atoms electrode erosion is reduced. One effect of sodium additions can be seen in he spectrum shown in FIG. 1 in which the sodium D lines are apparent. Similar spectra are observed, for example, with sodium iodide and aluminium chloride or with sodium iodide and aluminium iodide discharges. A further effect is that discharge stability is increased and 50 Hz flicker is reduced to negligible proportions.

The preferred ranges for the constituents are: mercury 10–30 mg $cm^{-3}$, aluminium trihalide 5–100 $\mu mol\ cm^{-3}$, alkali metal halide 0.5–150 $\mu mol\ cm^{-3}$, with the preferred range for the ratio of the number of molecules of alkali metal halide to the number of molecules of aluminium chloride is 0.1 to 1.5 (all molecules being regarded as in the monomeric form).

By way of example only, the lamps illustrated in FIGS. 2 and 3 will now be described.

In the lamp shown in FIG. 2, a silica discharge tube 11 is closed at either end by pinches 12 which make hermetic seals around current leads 13. These current leads are connected to tungsten electrodes 14 which may incorporate an emitter material. The discharge takes place between these electrodes. The discharge vessel has a length of 35 mm, an internal diameter of 10 mm and a volume of 2 $cm^3$. The electrode separation is 27 mm.

A similar discharge tube, shown in FIG. 3, has a volume 4.3 $cm^3$, internal diameter 15 mm, length 35 mm and electrode separation 20 mm, and is mounted in an outer envelope 15 made from hard glass with a frame of a type that is known to inhibit migration of alkali atoms through the silica. An auxiliary electrode 16 is provided for ease of starting. In both cases the temperature of the discharge tube ends may be increased by coating with zirconia or by any other suitable means.

The dosing components for the discharge tubes of this invention may be introduced into the tubes in any convenient form. By way of example, the halogen may be dosed as a compound of mercury, e.g., $Hg_2Cl_2$, or directly as the metal salt, e.g., $AlCl_3$, or separately as metal and halogen, or in any other convenient way. Alkali metals may be dosed directly, as the metal, or as halogen compounds e.g. NaCl, NaI, CaI.

EXAMPLE 1

The discharge space of a lamp as shown in FIG. 2 was dosed with 40.2 mg $Hg_2Cl_2$
11.3 mg Hg
3.3 mg Al
2.3 mg NaCl and filled with 20 torr of argon at room temperature. This lamp was operated at a power of 400 W when the light efficacy was 106 lm $W^{-1}$ and the lamp had a warm colour appearance. The colour temperature of this lamp was 3100 K and the colour rendering obtained therewith was satisfactory.

By way of comparison an aluminium chloride lamp with similar dosing but no sodium chloride has similar efficacy but a colour temperature of 7,000 K and greenish white colour appearance but the same colour rendering index of 65.

EXAMPLE 2

The discharge space of a lamp as shown in FIG. 2 was dosed with 38.6 mg $Hg_2Cl_2$
10.9 mg Hg
3.8 mg Al
10.2 mg NaI At a power of 350 W, the efficacy was 100 lm $W^{-1}$. The colour temperature of the lamp was 2,450 K and the lamp had a warm colour appearance.

EXAMPLE 3

A discharge tube similar to that shown in FIG. 2 but having a 6 mm bore, an electrode separation of 27 mm and a volume of 1 $cm^3$ was dosed with 17.2 mg $Hg_2Cl_2$
9.7 mg Hg
3.8 mg Al
0.7 mg NaCl and filled with argon to 50 torr at room temperature. The lamp at 200 W gave a light efficacy of 90–100 lm $W^{-1}$. The discharge was stable and had no perceptible flicker.

EXAMPLE 4

A discharge tube have a volume of 0.65 $cm^3$ with an electrode separation of 10 mm and a fill of 9.3 mg $Hg_2Cl_2$
8.5 mg Hg
1.45 mg Al
0.52 mg NaCl had a light efficacy of 70–80 lm $W^{-1}$ at 200 W and a colour temperature of about 3,200 K, again with good stability and no perceptible flicker.

What we claim is:

[1. A high-pressure electrical discharge lamp comprising:

a light-transmitting discharge vessel;

spaced electrodes in said vessel;

amd a gass fill in said vessel comprising mercury vapour, rare gas, aluminium halide and at least one alkali metal halide.]

[2. A high-pressure electrical discharge vessel comprising:

a light-transmitting discharge vessel having a wall power loaded at between 10 and 100 $Wcm^{-2}$ during operation;

spaced electrodes in said vessel; and a gass fill in said vessel comprising a rare gas, mercury in the range 0 to 30 mg $cm^{-3}$, an alkali metal halide and an aluminium halide, the alkali metal and aluminium halides being present in such quantities that the molar ratio of alkali metal halide to aluminium halide is from 0.1 to 1.5 and unevaporated aluminium and alkali metal halides are present during operation of the lamp.]

3. A discharge lamp as claimed in claim [2] *9*, in which the total number of aluminium and alkali metal atoms is greater than the total number of halogen atoms.

4. A discharge lamp according to claim [2] *9* wherein said gas fill comprises mercry in the range 10 to 30 mg $cm^{-3}$, aluminium chloride or iodide in the range 5 to 100 $\mu mol\ cm^{-3}$ and sodium chloride or iodide in the range 0.5 to 150 $\mu mol\ cm^{-3}$.

5. A discharge lamp according to claim 4 in which the total number of aluminium and alkali metal atoms is greater than the total number of halogen atoms.

*6. A high-pressure electrical discharge lamp comprising:*

*a light-transmitting discharge vessel;*

*spaced electrodes in said vessel;*

*and a gas fill in said vessel comprising mercury vapour, rare gas, aluminum halide and at least one alkali metal halide, the molar ratio of the alkali metal halide to the aluminum halide varying from 0.1 to 1.5.*

*7. The lamp of claim 6 where the alkali metal halide is selected from the group of a sodium halide and lithium halide.*

*8. The lamp of claim 7 where the sodium halide is sodium iodide.*

*9. A high-pressure electrical discharge vessel comprising:*

*a light-transmitting discharge vessel having a wall power loaded at between 10 and 100 $Wcm^{-2}$* during operation;

*spaced electrodes in said vessel;*

*and a gas fill in said vessel comprising a rare gas, mercury in amount up to 30 mg $cm^{-3}$*, aluminum halide and an alkali metal halide selected from the group of halides of lithium, sodium, potassium, rubidium, cesium and mixtures thereof, said alkali metal and aluminum halides being present in such quantities that the molar ratio of alkali metal halide to aluminum halide is from 0.1 to 1.5 and unevaporated aluminum and alkali metal halides are present during the operation of the lamp.

*10. The lamp of claim 9 where the alkali metal halide is selected from the group of a sodium halide and a lithium halide.*

*11. The lamp of claim 10 where the sodium halide is sodium iodide.*

* * * * *